May 9, 1961
B. BARENYI
2,983,543
PASSENGER SPACE CONSTRUCTION OF A MOTOR VEHICLE
Filed Sept. 3, 1957
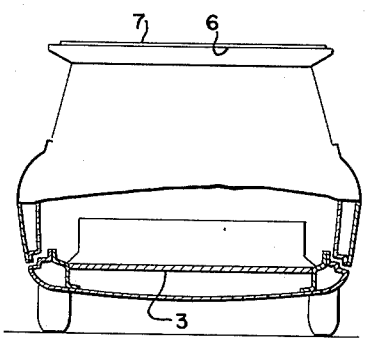
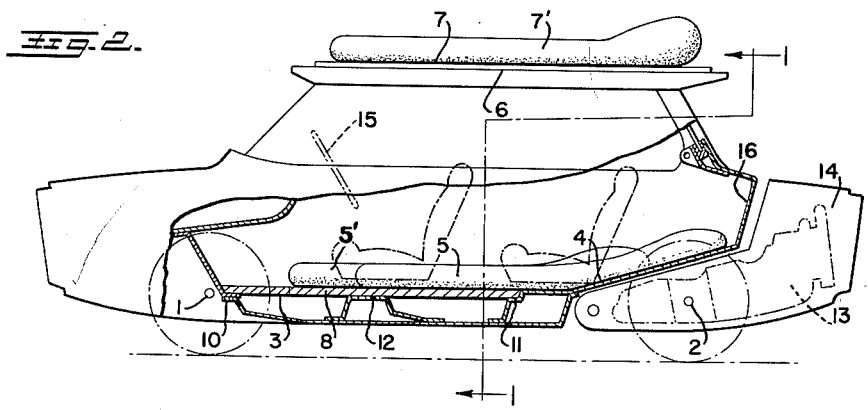
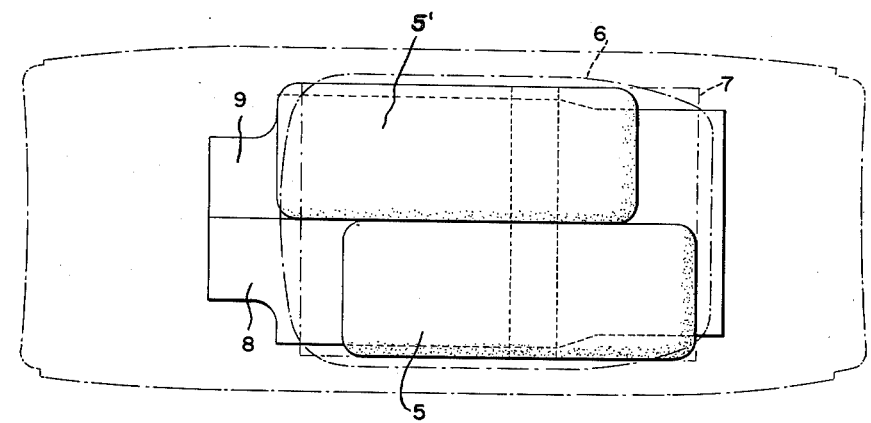
INVENTOR
BELA BARENYI
BY *Dicke and Craig*
ATTORNEYS

United States Patent Office 2,983,543
Patented May 9, 1961

2,983,543

PASSENGER SPACE CONSTRUCTION OF A MOTOR VEHICLE

Bela Barenyi, Stuttgart-Vaihingen, Germany, assignor to Daimler-Benz Aktiengesellschaft, Stuttgart-Unterturkheim, Germany Filed Sept. 3, 1957, Ser. No. 681,732

Claims priority, application Germany Sept. 3, 1956

5 Claims. (Cl. 296—23)

The present invention relates to a passenger motor vehicle provided with a driving engine arranged outside the wheel base and with removable seats as well as with a roof disposed above the passenger space. More particularly, the present invention relates to a camping passenger motor vehicle of the type described hereinabove which aims at a better utilization of the interior space and of the roof.

The present invention essentially resides in an essentially continuously flat roof, and more particularly consists in that the roof is essentially plane, extends horizontally, and projects at least at three sides thereof over the lateral limiting walls of the top of the passenger space, and in that the roof surface has a size which corresponds approximately to the bottom or floor surface of the passenger space.

The motor vehicles of the prior art as a rule only showed a relatively small flat roof portion, if any at all. The bottom or floor surface in passenger motor vehicles of this type to date for the most part was not level so that after removal of the seats the bottom or floor surfaces thereof could be utilized only poorly for the accommodation of goods to be transported or as sleeping place for the passengers.

The roof surface constructed in accordance with the present invention is level over the entire extent thereof and preferably is arranged horizontally. For purposes of further increasing the useful surface thereof, the roof projects on all sides thereof or at least on three sides thereof beyond the lateral limiting walls of the top enclosing the passenger space. As a result of such a construction, a relatively large surface is obtained on the roof on which goods in large quantity or with relatively large dimensions may conveniently find space or which roof surface may also be used appropriately as sleeping surfaces for at least two persons.

The bottom or floor surface of the passenger space in accordance with the present invention is appropriately so constructed that it has approximately the same size as the roof surface. This space having a relatively large surface may also serve during camping trips as sleeping place for the passengers of the motor vehicle.

The roof surface and the bottom or floor surface in accordance with the present invention are thereby constructed of such size that after removal of the seats and upon installation possibly of one or two flat insert plates, two air mattresses or other sleeping accommodations each may be placed on top of the roof as well as inside the vehicle below the roof. The insert plates which serve for purposes of covering the bottom or floor during use thereof as sleeping surface are secured during travel on the roof in any suitable manner on which one or two canoes or the like may be conveniently accommodated. Removable rails may also be arranged along the edges of the roof in order to prevent the goods from falling off or in order to assure greater safety to persons resting on the roof.

The surface at the bottom or floor in the interior of the passenger space adjoining the rear seats is also constructed essentially flat and extends rearwardly with an incline upwardly. This surface serve as head rests for passengers during use as sleeping accommodations. Appropriately, the space between the steering wheel and the rear terminal wall of the vehicle interior space is used as sleeping surface and is constructed accordingly.

Accordingly, it is an object of the present invention to provide a passenger motor vehicle which makes better use of the interior space of the motor vehicle.

Another object of the present invention is to provide a motor vehicle which has both a relatively large flat roof and a relatively large flat floor so as to increase the useful space of the vehicle.

A still further object of the present invention resides in the provision of a relatively large storage space by the use of a flat roof extending on all sides thereof or at least on three sides thereof beyond the lateral terminal walls of the top of the passenger motor vehicle.

Still another object of the present invention resides in the provision of a passenger motor vehicle which conveniently provides sleeping accommodations for four persons on camping trips and which at the same time enables storage or transportation of relatively large objects, such as boats, etc.

Another object of the present invention is to provide sleeping surfaces for the passengers of the motor vehicle, particularly during camping trips, by accommodating at least two persons on the bottom or floor of the vehicle and at least two persons on the roof of the vehicle.

These and other objects, features and advantages of the present invention will become more obvious from the following description when taken in connection with the accompanying drawing which shows, for purposes of illustration only, one embodiment in accordance with the present invention and wherein:

Figure 1 is a schematic transverse cross-sectional view through a motor vehicle in accordance with the present invention, taken along line 1—1 of Figure 2;

Figure 2 is a partially schematic longitudinal cross-sectional view of the vehicle shown in Figure 1, and Figure 3 is a top plan view illustrating the bottom or floor surface of the interior of the passenger space of the motor vehicle in accordance with the present invention when converted to provide sleeping accommodations.

Referring now to the drawing, wherein like reference numerals are used throughout the various views to designate like parts, reference numeral 3 designates the bottom or floor surface which is essentially flat in accordance with the present invention. The flat bottom surface 3 is disposed between the two wheel axles 1 and 2 within the interior of the motor vehicle, which as shown in the drawing comprises a body of the sedan type. After removal of seats of conventional constructions (shown in dotted lines in Figure 2), the flat bottom surface 3 may be used as storage surface to deposit thereon goods. The interior bottom surface 3 is constructed essentially in a flat manner and is arranged horizontally. A surface 4 adjoins the flat bottom surface 3, which surface 4 is slightly inclined rearwardly and upwardly. After installation of one or two mattresses 5, for example, inflatable mattresses, the inclined surface 4 may serve as head rest.

During use of two air mattresses, these mattresses 5 and 5' may be put in offset with respect to each other as shown in Figure 3 whereby the mattress 5' comes to lie between the steering wheel 15 and the rear terminal wall 16.

The roof 6 is also constructed flat over the entire extent thereof and is arranged horizontally and extends or projects beyond the oblique upwardly inclined lateral surfaces of the passenger space which are formed in the usual manner by the windshield, rear window, body parts, doors and windows, etc. As may be seen in Figure 2, a mattress 7' which also may be an inflatable air mattress is disposed on top of the flat roof 6 and rests on a special supporting plate 7, secured on or to the roof 6 in any conventional manner.

The floor or bottom surface 3 is constructed of such large size that at least the width thereof corresponds to the width of the roof 6 so that at least two beds or sleeping accommodations disposed adjacent one another may find adequate space thereon. In Figure 3 two insert plates 8 and 9 are shown which rest on the bottom surface 3, and which during travel may be mounted on the roof 6 and may be secured thereat in any conventional manner. The removable insert plates 8 and 9 rest on the edges 10 and 11 lying in a single plane and on the surface 12 in the interior of the vehicle. The edges 10 and 11 and surface 12 may be formed in any suitable conventional manner by parts of the motor vehicle such as cross bearer members of the vehicle or other reinforcing frame members.

The length of the roof 6 corresponds in the illustrated embodiment of a motor vehicle according to the present invention approximately to the length of a bed whereas the width of the roof 6 and the width of the bottom surface 3 corresponds approximately to the width of two beds. The driving engine 13 is arranged in the illustrated embodiment outside the wheel base and is accommodated in a self-contained cell 14 which may be readily secured or removed from the rest of the motor vehicle in any suitable manner, as disclosed, for example, in a number of my prior patents and copending applications.

While I have shown and described one preferred embodiment in accordance with the present invention, it is understood that the same is not limited thereto but is susceptible of many changes and modifications within the spirit of the present invention and I intend to cover all such changes and modifications as encompassed by the appended claims.

I claim:

1. A passenger motor vehicle having a sedan type body and provided with a driving engine disposed outside the wheel base, said body having seats removable from the interior of said body, said body comprising a roof arranged above the passenger space of essentially continuous flat horizontal construction, a plurality of lateral wall means limiting said passenger space, said roof extending at least on three of its sides beyond said lateral wall means and being adapted to support a mattress, said body further comprising bottom means, said bottom means comprising a member extending transversely of said vehicle in a single plane, said bottom means further comprising a portion having an upwardly and rearwardly inclined surface, means to support two mattresses in side-by-side relationship in said body after removal of said seats from said interior comprising said member and said portion including said surface, said means to support two mattresses further including removable means disposed on said member, said roof having a size corresponding essentially to that of said bottom means.

2. A passenger motor vehicle according to claim 1, wherein said removable means comprises plate members disposed lengthwise on said member in side-by-side relationship longitudinally of said vehicle.

3. A passenger motor vehicle according to claim 2, wherein said plate members are of a combined width essentially that of said member.

4. A passenger vehicle according to claim 1, wherein said portion extends rearwardly upwardly from a point spaced rearwardly of said removable means.

5. A passenger vehicle according to claim 1, wherein said plurality of lateral wall means includes a transverse rear wall, said portion terminating at said rear wall.

References Cited in the file of this patent

UNITED STATES PATENTS

| | | |
|---|---|---|
| 1,247,840 | Jackman | Nov. 27, 1917 |
| 1,658,110 | Warren | Feb. 7, 1928 |
| 1,984,681 | Jackson | Dec. 18, 1934 |
| 2,643,913 | Lyon | June 30, 1953 |

FOREIGN PATENTS

| | | |
|---|---|---|
| 977,539 | France | Nov. 15, 1950 |
| 767,643 | Great Britain | Feb. 6, 1957 |
| 402,679 | Italy | Mar. 18, 1943 |
| 309,378 | Switzerland | Nov. 1, 1955 |

OTHER REFERENCES

"Motorlounge," article in "The Autocar" magazine of Dec. 18, 1936, page 1212.